(12) United States Patent
Hui et al.

(10) Patent No.: US 7,720,130 B2
(45) Date of Patent: May 18, 2010

(54) EFFICIENT RECEIVER ARCHITECTURE FOR TRANSMIT DIVERSITY TECHNIQUES

(75) Inventors: Yan Hui, San Diego, CA (US); Gibong Jeong, Seoul (KR)

(73) Assignee: Texas Instruments Incorporated, Dallas, TX (US)

( * ) Notice: Subject to any disclaimer, the term of this patent is extended or adjusted under 35 U.S.C. 154(b) by 2192 days.

(21) Appl. No.: 10/232,796

(22) Filed: Aug. 28, 2002

(65) Prior Publication Data

US 2004/0047402 A1  Mar. 11, 2004

(51) Int. Cl.
*H04B 1/00* (2006.01)
(52) U.S. Cl. ........................................ 375/141
(58) Field of Classification Search ............ 375/141, 375/340, 148; 370/342, 203, 204
See application file for complete search history.

(56) References Cited

U.S. PATENT DOCUMENTS

| | | | |
|---|---|---|---|
| 6,317,410 B1 * | 11/2001 | Allpress et al. | 370/203 |
| 6,711,124 B2 * | 3/2004 | Khayrallah et al. | 370/208 |
| 6,754,253 B2 * | 6/2004 | Guey | 375/148 |
| 6,775,260 B1 * | 8/2004 | Dabak et al. | 370/342 |
| 2002/0044591 A1 * | 4/2002 | Lee et al. | 375/130 |
| 2003/0016637 A1 * | 1/2003 | Khayrallah et al. | 370/329 |
| 2003/0235147 A1 * | 12/2003 | Walton et al. | 370/204 |

FOREIGN PATENT DOCUMENTS

EP   1128575 A1 *  8/2001

\* cited by examiner

*Primary Examiner*—Chieh M Fan
*Assistant Examiner*—Jaison Joseph
(74) *Attorney, Agent, or Firm*—Ronald O. Neerings; Wade James Brady, III; Frederick J. Telecky, Jr.

(57) ABSTRACT

Transmit diversity (TD) has become a common technique used in modern wireless communications systems to improve performance. TD uses multiple antennas (e.g., 110 and 111) at a transmitter (e.g., 105) to transmit multiple encoded datastreams and a single (or multiple) antenna (e.g., 116) at a receiver (e.g., 115) to receive the datastreams. Preferred embodiments of the present invention provide a general architecture (e.g., 705) that can support different TD schemes and even non-TD, simplifying receiver design and minimizing hardware usage.

10 Claims, 5 Drawing Sheets

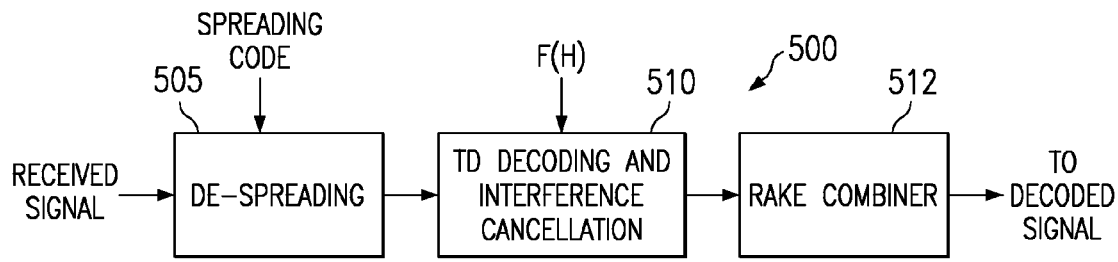

FIG. 5

$$\begin{cases} f_1(h) = real([h^*_{1,0}+h_{2,0}, h^*_{1,1}-h_{2,1}]^T) \\ f_2(h) = imag([h^*_{1,0}+h_{2,0}, h^*_{1,1}-h_{2,1}]^T) \\ f_3(h) = imag([h^*_{1,0}-h_{2,0}, h^*_{1,1}+h_{2,1}]^T) \\ f_4(h) = real([h^*_{1,0}-h_{2,0}, h^*_{1,1}+h_{2,1}]^T) \\ f_5(h) = real([-h^*_{1,0}+h_{2,0}, h^*_{1,1}+h_{2,1}]^T) \\ f_6(h) = imag([-h^*_{1,0}+h_{2,0}, h^*_{1,1}+h_{2,1}]^T) \\ f_7(h) = imag([h^*_{1,0}+h_{2,0}, -h^*_{1,1}+h_{2,1}]^T) \\ f_8(h) = real([h^*_{1,0}+h_{2,0}, -h^*_{1,1}+h_{2,1}]^T) \end{cases} \Big\} 605$$

FIG. 6a $$f_1(h) = real([h^*_{1,0}, h^*_{1,1}]^T) \quad f_2(h) = imag([h^*_{1,0}, h^*_{1,1}]^T)$$
$$f_3(h) = imag([h^*_{1,0}, h^*_{1,1}]^T) \quad f_4(h) = real([h^*_{1,0}, h^*_{1,1}]^T)$$
$$f_5(h) = real([h^*_{2,0}, -h^*_{2,1}]^T) \quad f_6(h) = imag([h^*_{2,0}, -h^*_{2,1}]^T)$$
$$f_7(h) = imag([h^*_{2,0}, -h^*_{2,1}]^T) \quad f_8(h) = real([h^*_{2,0}, -h^*_{2,1}]^T)$$

FIG. 6b $$f_1(h) = [h_{1,I}, h_{2,I}]^T \quad f_2(h) = [-h_{1,Q}, h_{2,Q}]^T$$
$$f_3(h) = [h_{1,I}, -h_{2,I}]^T \quad f_4(h) = [-h_{1,Q}, -h_{2,Q}]^T$$
$$f_5(h) = [h_{1,I}, -h_{2,I}]^T \quad f_6(h) = [-h_{1,Q}, -h_{2,Q}]^T$$
$$f_7(h) = [h_{1,I}, h_{2,I}]^T \quad f_8(h) = [-h_{1,Q}, h_{2,Q}]^T$$

FIG. 6c $$f_1(h) = [h_{1,I}, h_{1,I}, h_{2,I}, h_{2,I}]^T \quad f_2(h) = [-h_{1,Q}, -h_{1,Q}, h_{2,Q}, h_{2,Q}]^T,$$
$$f_3(h) = [-h_{1,Q}, h_{1,Q}, h_{2,Q}, -h_{2,Q}]^T \quad f_4(h) = [h_{1,I}, -h_{1,I}, h_{2,I}, -h_{2,I}]^T,$$
$$f_5(h) = [-h_{2,I}, -h_{2,I}, h_{1,I}, h_{1,I}]^T \quad f_6(h) = [h_{2,Q}, h_{2,Q}, h_{1,Q}, h_{1,Q}]^T,$$
$$f_7(h) = [h_{2,Q}, -h_{2,Q}, h_{1,Q}, -h_{1,Q}]^T \quad f_8(h) = [-h_{2,I}, h_{2,I}, h_{1,I}, -h_{1,I}]^T,$$
$$f_9(h) = [h_{3,I}, -h_{3,I}, h_{4,I}, -h_{4,I}]^T \quad f_{10}(h) = [-h_{3,Q}, h_{3,Q}, h_{4,Q}, -h_{4,Q}]^T,$$
$$f_{11}(h) = [-h_{3,Q}, -h_{3,Q}, h_{4,Q}, h_{4,Q}]^T \quad f_{12}(h) = [h_{3,I}, h_{3,I}, h_{4,I}, h_{4,I}]^T,$$
$$f_{13}(h) = [-h_{4,I}, h_{4,I}, h_{3,I}, -h_{3,I}]^T \quad f_{14}(h) = [h_{4,Q}, -h_{4,Q}, h_{3,Q}, -h_{3,Q}]^T,$$
$$f_{15}(h) = [h_{4,Q}, h_{4,Q}, h_{3,Q}, h_{3,Q}]^T \quad f_{16}(h) = [-h_{4,I}, -h_{4,I}, h_{3,I}, h_{3,I}]^T.$$

*FIG. 6d*

$$\begin{cases}
f_1(h) = real([h_1^* - h_2, h_1^* - h_2, h_1^* + h_2, h_1^* + h_2]^T) \\
f_2(h) = imag([h_1^* - h_2, h_1^* - h_2, h_1^* + h_2, h_1^* + h_2]^T) \\
f_3(h) = real([h_1^* + h_2, h_1^* + h_2, -h_1^* + h_2, -h_1^* + h_2]^T) \\
f_4(h) = imag([h_1^* + h_2, h_1^* + h_2, -h_1^* + h_2, -h_1^* + h_2]^T) \\
f_5(h) = real([-h_1 - h_2^*, -h_1 - h_2^*, h_1 - h_2^*, h_1 - h_2^*]^T) \\
f_6(h) = imag([-h_1 - h_2^*, -h_1 - h_2^*, h_1 - h_2^*, h_1 - h_2^*]^T) \\
f_7(h) = real([h_1 - h_2^*, h_1 - h_2^*, h_1 + h_2^*, h_1 + h_2^*]^T) \\
f_8(h) = imag([h_1 - h_2^*, h_1 - h_2^*, h_1 + h_2^*, h_1 + h_2^*]^T) \\
f_9(h) = real([h_3^* - h_4, -h_3^* + h_4, h_3^* + h_4, -h_3^* - h_4]^T) \\
f_{10}(h) = imag([h_3^* - h_4, -h_3^* + h_4, h_3^* + h_4, -h_3^* - h_4]^T) \\
f_{11}(h) = real([h_3^* + h_4, -h_3^* - h_4, -h_3^* + h_4, h_3^* - h_4]^T) \\
f_{12}(h) = imag([h_3^* + h_4, -h_3^* - h_4, -h_3^* + h_4, h_3^* - h_4]^T) \\
f_{13}(h) = real([-h_3 - h_4^*, h_3 + h_4^*, h_3 - h_4^*, -h_3 + h_4^*]^T) \\
f_{14}(h) = imag([-h_3 - h_4^*, h_3 + h_4^*, h_3 - h_4^*, -h_3 + h_4^*]^T) \\
f_{15}(h) = real([h_3 - h_4^*, -h_3 + h_4^*, h_3 + h_4^*, -h_3 - h_4^*]^T) \\
f_{16}(h) = imag([h_3 - h_4^*, -h_3 + h_4^*, h_3 + h_4^*, -h_3 - h_4^*]^T)
\end{cases}$$

*FIG. 6e*

EFFICIENT RECEIVER ARCHITECTURE FOR TRANSMIT DIVERSITY TECHNIQUES

FIELD OF THE INVENTION

This invention relates generally to digital wireless communications and particularly to receiver architectures in wireless communications systems using transmit diversity.

BACKGROUND OF THE INVENTION

Normal wireless communications systems use a transmitter with a single antenna and a receiver with a single antenna to transmit and receive information. Wireless communications systems with a single transmitter antenna are commonly referred to as single output (SO) systems and systems with a single receiver antenna are known as single input (SI) systems. Therefore, a single input and single output system is known as a SISO system.

In search of increased data rates, greater channel capacity (better efficiency, defined in bits/second/hertz), better transmission quality, and higher diversity, wireless communications designers have started to use multiple antennas, both at the transmitter and the receiver. A system with multiple transmitter antennas is known as a multiple output (MO) system and one with multiple receiver antennas is know as a multiple input (MI) system. Systems with both MO and MI are referred to as MIMO systems. Communications systems with multiple input and/or output antennas offer greater diversity, increased channel capacity, and typically trade off error performance for higher data rates. One class of communications systems with multiple output antennas are commonly said to have transmit diversity, or TD for short.

Unfortunately, designing a wireless receiver for a communications system featuring TD can be difficult when the communications system can use one out of a plurality of different TD schemes. For example, in IS2000, a third generation wireless communications system standard, two different open-loop TD schemes have been adopted for use. The two TD schemes are Orthogonal Transmit Diversity (OTD) and Space-time Spreading (STS). In Wideband Code-Division Multiple Access (WCDMA), yet another third generation communications system standard, both open-loop and closed-loop TD schemes have been accepted. In other third generation communications systems, different open-loop and closed-loop TD schemes, including TD schemes for MIMO systems, are under consideration for acceptance into the various technical standards.

TD schemes operate by transmitting signals via multiple antennas from the same transmitter that are received by a receiver and the receiver performs post-processing to recover the transmitted signals. Alternatively, TD schemes may transmit a signal that is received by multiple antennas with each of the multiple receive antennas producing a slightly different image that are combined to recover the transmitted signal. Both the transmitter and the receiver may have multiple antennas. For example, in OTD, separate antennas are used to transmit even and odd data bits. While in STS, odd and even data bits are transmitted on each transmit antenna.

A concern when designing a TD receiver for the various TD schemes is that in order to support all of the TD schemes specified in a single technical standard or to support TD schemes in multiple standards, the receiver architecture would necessarily be very complex and large. For a receiver that supports dual or multiple standards, the problem becomes even more significant.

A straightforward implementation of the receiver would involve the design of separate TD decoders for each TD scheme specified in the technical standard. However, such an approach would be highly inefficient. For example, in a communications system that uses STS and OTD TD schemes with two transmit antennas, the combined TD decoder architecture would require: 40 real multipliers, 12 adders, and two memory elements. The large number of hardware elements implies a large physical size for the receiver and the consumption of a large amount of power. Obviously, a receiver architecture with a TD decoder that can share hardware elements would greatly reduce both the complexity and the size of the receiver.

In one solution, proposed in U.S. Pat. No. 6,317,410, a TD decoder architecture supporting STS and OTD TD schemes is proposed wherein implementation complexity is reduced through the use of switches. The switches permit the sharing of certain hardware components, such as multipliers, between the two TD schemes. Though the switches permit a more efficient receiver implementation, it is clear that the complexity of the receiver architecture is not minimized. Additionally, the proposed solution works only with STS and OTD TD schemes. The additional support of any other TD scheme would require a redesign of the TD decoder architecture.

An additional concern when designing a TD receiver is simply the minimization of the hardware requirement for the receiver. It is desirable to have the TD receiver's hardware requirement to be close to that of a non-TD receiver. As stated previously, a receiver with less hardware is a smaller receiver that uses less power and is cheaper overall to manufacture.

A need has therefore arisen for a TD receiver architecture that minimizes hardware requirements and can simultaneously support multiple TD schemes without incurring significantly increased hardware complexity.

SUMMARY OF THE INVENTION

In one aspect, the present invention provides a method for processing a transmission diversity (TD) encoded transmission comprising the steps of receiving the TD encoded transmission, de-spreading the TD encoded transmission, and applying a set of functions of channel estimations to the de-spread TD encoded transmission to produce a TD decoded signal stream.

In another aspect, the present invention provides a circuit comprising a first multiplier arm having an input coupled to a de-spreader, the first multiplier arm comprising a first and a second multiplier, the first multiplier to multiply a first de-spread symbol with a first function of channel estimations and the second multiplier to multiply the first de-spread symbol with a second function of channel estimations, a second multiplier arm having an input coupled to the de-spreader, the second multiplier arm comprising a third and a fourth multiplier, the third multiplier to multiply a second de-spread symbol with a third function of channel estimations and the fourth multiplier to multiply the second de-spread symbol with a fourth function of channel estimations, a first summing circuit coupled to the first and the second multiplier arms, the first summing circuit to combine the products of the first and third multipliers, a second summing circuit coupled to the first and second multiplier arms, the second summing circuit to combine the products of the second and fourth multipliers, a third summing circuit coupled to the first summing circuit, the third summing circuit to combine the output of the first summing circuit with a previous output of the first summing circuit, and a fourth summing circuit coupled to the second summing circuit, the fourth summing circuit to combine the output of the second summing circuit with a previous output of the second summing circuit.

In yet another aspect, the present invention provides a receiver comprising a radio frequency (RF) input to receive a transmitted signal, a de-spreading unit (DU) coupled to the RF input, the DU containing circuitry to de-spread an encoded signal stream and to produce de-spread symbols, a transmit diversity (TD) decoding and interference cancellation (TDIC) unit coupled to the DU, the TDIC containing circuitry to apply a set of functions of channel estimations to the de-spread TD symbols to produce a TD decoded signal stream.

The present invention provides a number of advantages. For example, use of a preferred embodiment of the present invention results in a receiver architecture for a TD receiver such that additional hardware requirements for the TD receiver are minimal when compared to a non-TD receiver.

Additionally, use of a preferred embodiment of the present invention results in a receiver architecture for a TD receiver supporting multiple TD schemes with a constant degree of complexity regardless of the number of different TD schemes supported.

Also, use of a preferred embodiment of the present invention allows for the design of a general purpose TD receiver that is capable of supporting a large array of TD schemes in addition to non-TD transmission.

BRIEF DESCRIPTION OF THE DRAWINGS

The above features of the present invention will be more clearly understood from consideration of the following descriptions in connection with accompanying drawings in which:

FIG. 5 illustrates a block diagram of a transmit diversity receiver capable of supporting a variety of transmit diversity schemes, including no transmit diversity, according to a preferred embodiment of the present invention;

FIGS. 6a-e provide examples of functions of channel estimations for various two- and four-antenna transmit diversity schemes according to a preferred embodiment of the present invention.

DETAILED DESCRIPTION OF ILLUSTRATIVE EMBODIMENTS

The making and use of the various embodiments are discussed below in detail. However, it should be appreciated that the present invention provides many applicable inventive concepts, which can be embodied in a wide variety of specific contexts. The specific embodiments discussed are merely illustrative of specific ways to make and use the invention, and do not limit the scope of the invention.

The discussion of the preferred embodiments of the present invention focuses on a particular type of third generation wireless communications system, one that is adherent to the Third Generation Partnership Project 2 (3GPP2) technical standard. The physical layer of the wireless communications system is specified in a 3GPP2 technical standard entitled "Physical Layer Standard for CDMA2000 Spread Spectrum Systems, Release A, Version 6.0," published Feb. 8, 2002. The technical standard is incorporated herein by reference. However, the present invention is not limited to applicability with wireless communications systems adherent to the 3GPP2 technical standard. The present invention is applicable to other wireless communications system using TD, for example, WCDMA Release 99, HSDPA (high speed downlink packet access) Release 5, IS2000 and 1xEV-DV (1xEvolution-Data and Voice, i.e., IS2000 Release C) and even to wireless communications systems not using TD transmission at all.

Figure 1A:
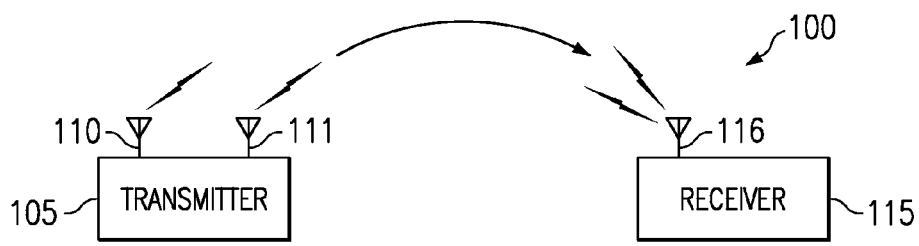
FIGS. 1a-c illustrate various wireless communications systems with transmitters and receivers using transmission diversity.

Referring now to FIG. 1a, the diagram illustrates a wireless communications system 100 with a transmitter 105 with two antennas. The wireless communications system 100 is displayed with the transmitter 105 and a receiver 115. It is possible that the wireless communications system 100 has additional transmitters and receivers, but they are not displayed in FIG. 1a. FIG. 1a displays the transmitter 105 with two transmit antennas 110 and 111. The transmitter 105 may be configured to transmit the same data with a different modulation scheme on each of the two antennas. Alternatively, the transmitter 105 may transmit different data using different modulation on each of the two antennas.

The receiver 115 is displayed as having one receive antenna 116. With a single antenna 116, the receiver 115 receives both transmissions from the two transmit antennas 110 and 111 on the one receive antenna 116. With the received signal, the receiver 115 uses its receive circuitry to decode the two transmissions and generate a data stream. The receiver 115 has the appropriate receive circuitry to decode and combine the transmissions made by the transmitter 105. The wireless communications system as displayed in FIG. 1a is what is known as a SIMO (single input, multiple output) system.

Figure 1B:
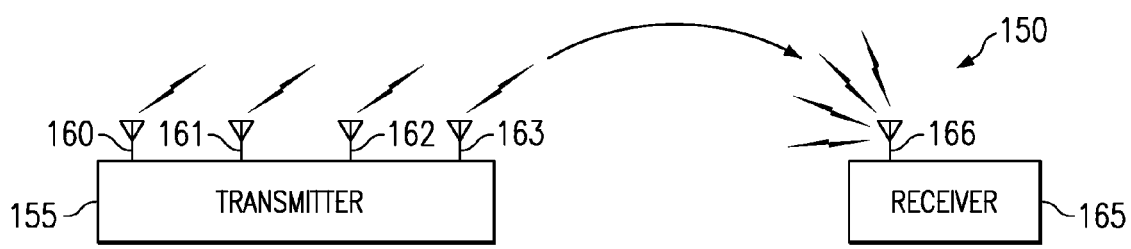

Referring now to FIG. 1b, the diagram illustrates a wireless communications system 150 with a transmitter 155 with four transmit antennas 160, 161, 162, and 163. The wireless communications system 150 is similar to the wireless communications system displayed in FIG. 1a. The receiver 165 with a single receive antenna 166 receives the four transmissions made by the transmitter 155 and its receive circuitry decodes the four transmissions into a data stream.

Figure 1C:
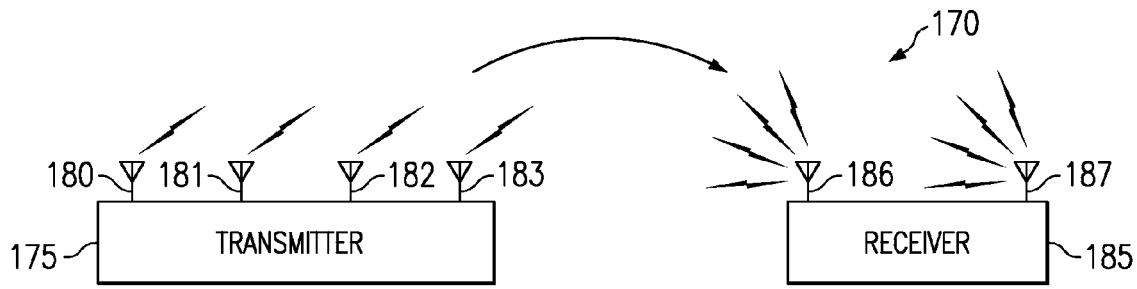

Referring now to FIG. 1c, a diagram illustrates a wireless communications system 170 with a transmitter 175 with four transmit antennas 180, 181, 182, and 183 and a receiver 185 with two receive antennas 186 and 187. The receiver 185 with the two receive antennas 186 and 187 will receive two versions of each of the four transmissions transmitted by the transmitter 175. Each of the two versions of the transmissions would ideally be slightly different due to the different locations of the two receive antennas 186 and 187. The receiver 185 uses the two different received signals to decode the four transmissions into a data stream. The communications system 170 is known as a MIMO (multiple input, multiple output) system.

Figure 2:
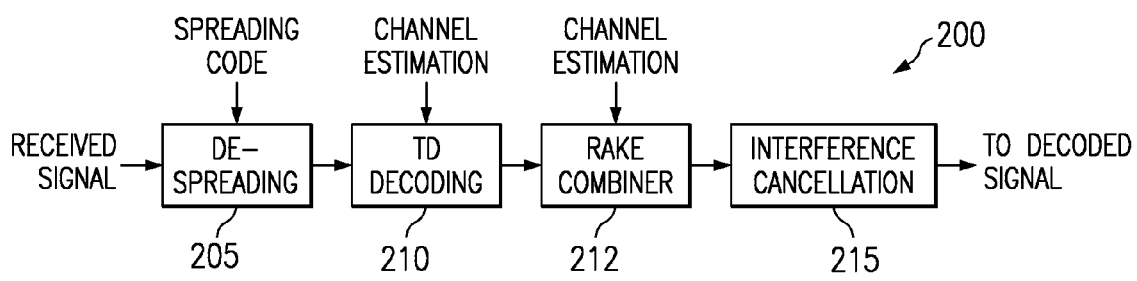
FIG. 2 illustrates a block diagram of a typical receiver in a wireless communications system using transmission diversity.

Referring now to FIG. 2, a diagram illustrates the structure of a TD receiver 200. The TD receiver 200 includes a signal input where it receives the transmitted signal. Typically, the TD receiver 200 receives the transmitted signal via one or more antennas (not shown), however, it is possible that the TD receiver 200 receives the transmitted signal via a direct wired coupling. This direct coupling is normally used during the testing and development phase of the product. Alternatively, the TD receiver 200 may feature an auxiliary radio frequency (RF) input wherein an antenna with more signal gain may be attached to improve the performance of the TD receiver 200.

In wireless communications systems, the transmitted signal is normally an encoded version of the actual data stream. The encoding is used to improve both the error performance of the system and to increase efficient usage of the available bandwidth. The encoding must be removed prior to usage of the data stream. In some wireless communications systems, the encoding is commonly referred to as spreading and the transmitted signal is said to have been spread. The received signal is delivered to a de-spreading unit 205. The function of the de-spreading unit is to remove the encoding (or spreading) performed on the data stream. In many wireless communications systems, the data stream is encoded (or spread) whether or not the transmission uses a TD scheme. Therefore, a de-spreading unit is typically present in both TD and non-TD receivers.

The de-spreading unit 205 has two inputs, the first being the received signal and the second input of the de-spreading unit 205 is a local copy of the spreading code used to spread the data stream. It is normal to chose a spreading code so that the application of the spreading code onto an already spread signal yields the un-spread data stream, although this does not necessarily have to be the case. After being de-spread, the un-spread data stream is forwarded to a TD decoding unit 210. A normal chain of events in a TD transmitter is to have an un-encoded (original) data stream be TD encoded and then spread. Therefore, a reverse sequence of operations is normally used to extract the original data stream.

In order to perform TD decoding, the TD decoding unit 210 needs to know how to decode the particular TD encoding, therefore the TD decoding unit 210 has a second input for a channel estimation. The channel estimation is normally a complex vector or matrix (depending on the number of transmit and receive antennas) that attempts to describe the behavior of the communications channel used to transmit the TD encoded and spread data stream. Channel estimation is used to correct the phase error of the de-spread data for further processing for the TD decoding. For systems using orthogonal TD encoding, which is well understood by those of ordinary skill in the art of the present invention, application of the channel estimation to the proper de-spread data stream followed by TD decoding processing yields the original data stream. Orthogonal TD encoding means that the diversity streams are encoded such that they do not have interaction with one another, therefore there is no inter-diversity interference.

The output of the TD decoding unit 210 is then provided to a multipath combiner, usually referred to as Rake combiner unit 212. The Rake combiner 212 is used to combine together the TD decoded signals from the multipath signal to take advantage of the multipath diversity. The algorithm that can be used in a multipath combiner can be Maximum Ratio Combining (MRC) or others. It should be noted that multipath combining can also be performed after the channel correction in the TD decoding block 210, i.e. before the TD decoding processing. This does not change the performance of the receiver.

In systems using non-orthogonal TD encoding, interference exists between the various diversity streams and additional processing must be performed. The additional processing is performed in an interference cancellation unit 215. The interference cancellation unit 215 performs an operation that may be described mathematically as follows:

$$y_{Nx1} = Z_{NxN} \cdot H_{NxN}^H r_{Nx1} = (Z_{NxN} \cdot H_{NxN}^H)(H_{NxN}^H s_{Nx1}) + (Z_{NxN} \cdot H_{NxN}^H) n_{Nx1}$$

where: $S_{Nx1}$ is the transmitted signal; $r_{Nx1}$ is the received signal; $n_{Nx1}$ is the noise signal; $y_{Nx1}$ is the de-spread, TD decoded, and interference cancelled signal;

$$H_{NxN}^H$$

is the channel matrix; $Z_{NxN}$ is the operations matrix for non-orthogonal TD decoding, including interference cancellation. Notice that for a system using orthogonal TD, the operations matrix, $Z_{NxN}$, reduces to an identity matrix.

The output of the interference cancellation unit 215 is a TD decoded signal, or the original data stream. The original data stream is then ready for any further processing needed or is ready for use by a digital device (not shown) that may be connected to the TD receiver 200.

Figure 3:
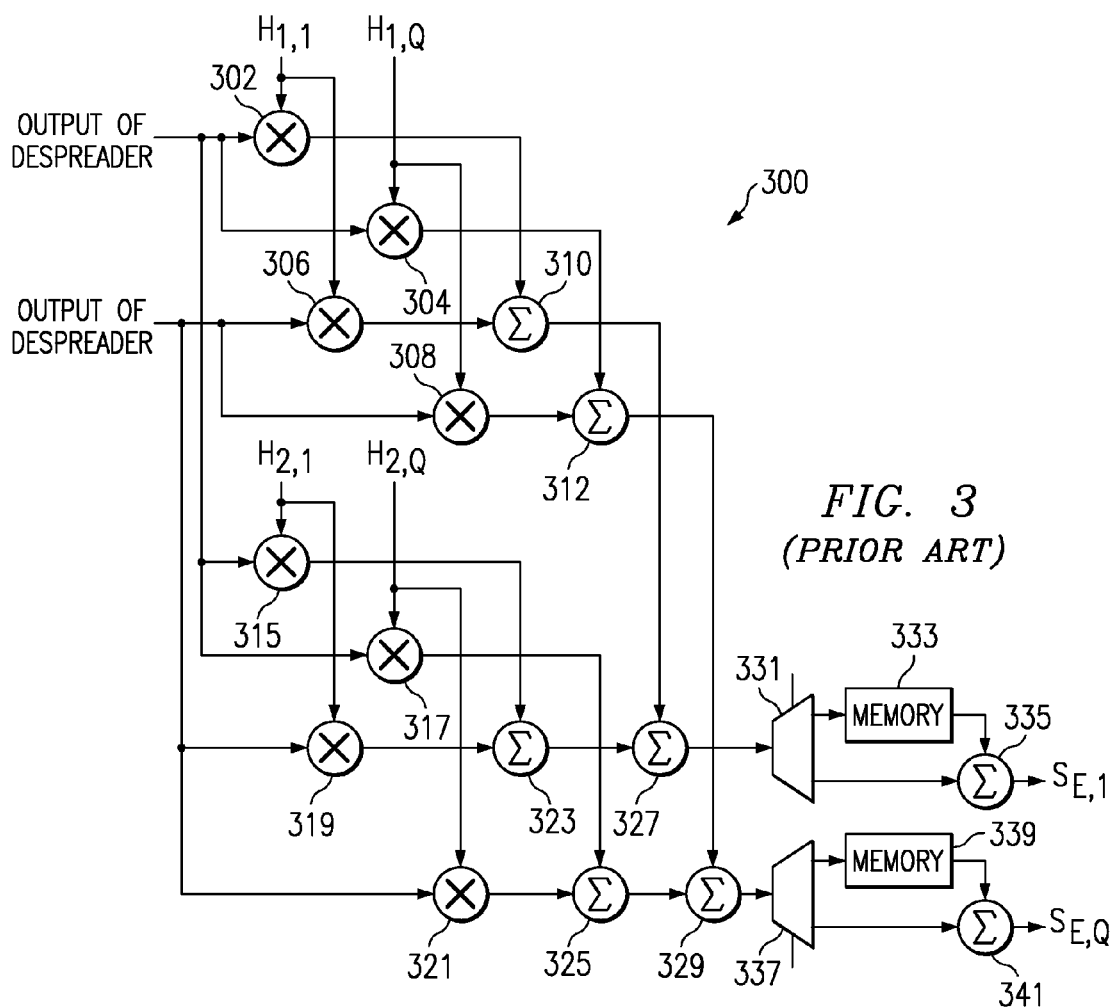
FIG. 3 illustrates a prior art transmission diversity decoder for use in a transmission diversity receiver that is using space-time spreading.

Referring now to FIG. 3, the diagram illustrates a prior art TD decoder 300 for space-time spreading (STS) decoding. FIG. 3 is intended to represent one possible implementation of a TD decoder that is specifically designed for one particular TD scheme, in this case, STS. Notice that the TD decoder 300 as displayed in FIG. 3 is highly unlikely to operate with any other TD scheme without some modification. The TD decoder 300 typically is part of a receiver that makes use of both in-phase (I) and quadrature-phase (Q) versions of the received signal.

For the discussion purposed, the following notations will be used:

$r_{i,k}$ represents the received signal, where i is time index (or equivalently symbol index), k represents in-phase (I) and quadrature-phase (Q) versions of the received signal. $r_{i,k}$ is a real value (number).

$h_{n,i,k}$ represents the channel estimate, where n is the channel index corresponding to n-th transmit antenna, i is time index (or equivalently symbol index), k represents in-phase (I) and quadrature-phase (Q) versions of the received signal. $h_{n,i,k}$ is a complex value (number).

$h_{n,i}$ represents the complex-valued channel estimate, where n and i have the same meaning as in $h_{n,i,k}$ above.

$h_{n,k}$ represents the real-valued channel estimate, where n and k have the same meaning as in $h_{n,i,k}$ above.

$h_n$ represents the complex-valued channel estimate, where of value the channel estimates do not change for across N symbol periods, and n has the same meaning as in $h_{n,i,k}$ above.

$s_{i,k}$ represents the TD decoded signal, where i is time index (or equivalently symbol index) and it can also be represented by even (e) or odd (o), k represents in-phase (I) and quadrature-phase (Q) versions of the received signal. $s_{i,k}$ is a real value (number).

Input to the TD decoder 300 is the de-spread received signal in the form of data symbols, $r_{1,I}$, $r_{2,I}$, $r_{1,Q}$, and $r_{2,Q}$, where $r_{1,I}$ is the first in-phase symbol and $r_{2,Q}$ is the second quadrature-phase symbol. The de-spread receive signals are then multiplied with channel estimates, $h_{1,I}$, $h_{1,Q}$, $h_{2,I}$, and $h_{2,Q}$, where $h_{1,I}$ is the first channel estimate for the in-phase symbol and $h_{1,Q}$ is the first channel estimate for the quadrature-phase symbol. The channel estimates are numbers describing the impulse response of the communications channel. Since both the de-spread symbols and the channel estimates are real values, the multipliers perform real multiplications. The multiplications are performed in multipliers 302, 304, 306, 308, 315, 317, 319, and 321.

The outputs of the various multiplication operations are combined in summing circuits 310, 312, 323 and 325. For example, summing circuit 325 subtracts the results of the multiplication of the in-phase symbols with $h_{2,I}$ (multiplier 315) and from the multiplication of the quadrature-phase symbols $h_{2,Q}$ (multiplier 321). Notice that the particular arrangement of the multiplications and additions are a function of the particular TD scheme being implemented (in this case, STS) and that the arrangements can and will change for different TD schemes.

The results of the summing circuits 310, 312, 323, and 325 are then combined in additional summing circuits 327 and 329. A pair of de-multiplexors (or some other equivalent circuit) 331 and 337 is used to route the output of the summing circuits 327 and 329 to either memory elements 333 and 339 or directly to summing circuits 335 and 341. The net result of the de-multiplexors 331 and 337 is that the multiplications and summations with the first symbols ($r_{1,I}$ and $r_{1,Q}$) are added to the second symbols ($r_{2,I}$ and $r_{2,Q}$) to form TD decoded symbols $s_{e,I}$ and $s_{e,Q}$. For example, when it is the first symbols ($r_{1,I}$ and $r_{1,Q}$) being multiplied and added, the de-multiplexors 331 and 337 direct the result to the memory elements 333 and 339, while the results of the multiplications and additions of the second symbols ($r_{2,I}$ and $r_{2,Q}$) are directed to the summing circuits 335 and 341 where they are combined with the results stored in the memory elements 333 and 339.

The TD decoder 300 displayed in FIG. 3 is specifically designed for STS decoding only. Therefore, it does not support any other kind of TD scheme. Hence, its use in a wireless communications system where different TD schemes may be used is limited. It is possible for a TD receiver to contain the TD decoder 300 as displayed, however, it must also contain other TD decoders that can process any remaining TD schemes being used in the communications system. Such an implementation, wherein separate TD decoders are used for each TD scheme, is highly inefficient however, since there is a large amount of redundancy in the multiple TD decoders. This results in an overly large TD receiver that consumes more power than needed.

It is possible to create a TD decoder that has sufficient built-in flexibility so that a single TD decoder can support different TD schemes. A single TD decoder design achieves a greater level of efficiency due to its reuse of various circuit components, such as multipliers, adders, and memory elements.

Figure 4:
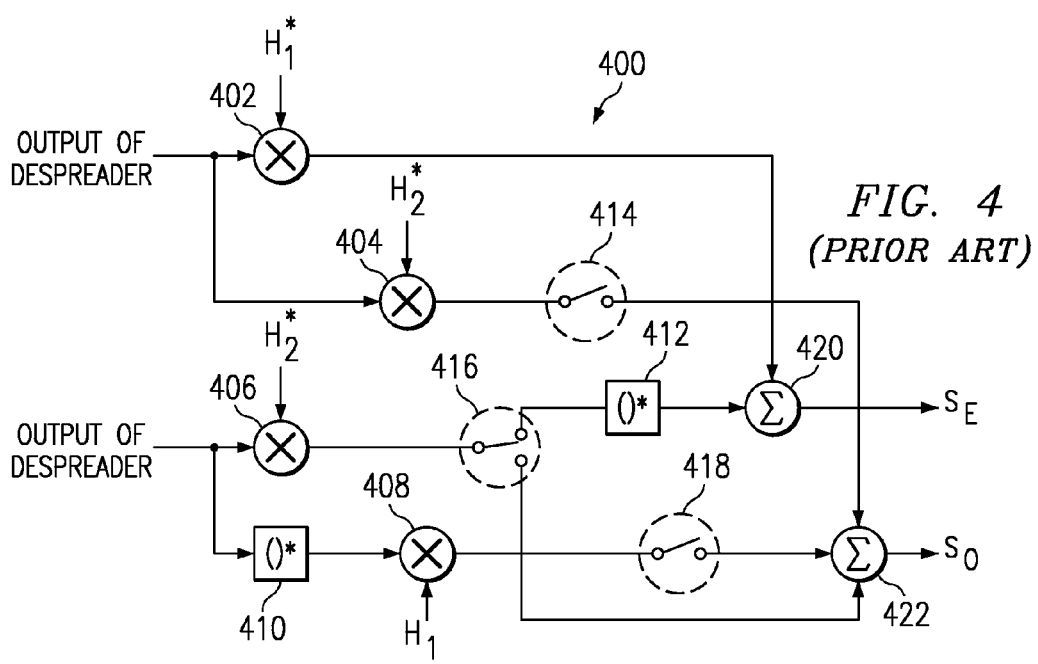
FIG. 4 illustrates a prior art transmission diversity decoder for use in a transmission diversity receiver that is capable of supporting both space-time spreading and orthogonal transmit diversity.

Referring now to FIG. 4, the diagram illustrates a prior art implementation of a single TD decoder 400 capable of supporting both STS and OTD TD schemes. The TD decoder 400 uses switches 414, 416, and 418 to allow the sharing of certain components. The switches are configured based upon the particular TD scheme to be decoded. The sharing permits the components, such as multipliers (for example 406 and 408), summing circuits 420 and 422, and complex conjugate converters 410 and 412 to be used when the TD decoder 400 is operating in either STS or OTD TD decoding modes. Note that the multipliers 402, 404, 406, and 408 are actually complex number multipliers and the multipliers displayed in FIG. 3 are real number multipliers, the difference between complex number multipliers and real number multipliers being that a single complex number multiplier is created from four real number multipliers. Therefore, in terms of hardware complexity, a single complex number multiplier is equal to four real number multipliers.

For comparison purposes, Table 1 below provides a tabulation of TD decoder components for various TD decoders, including the two TD decoder designs illustrated in FIGS. 3 and 4. The Table 1 lists TD decoders for STS and various other TD schemes with two and four transmit antennas. In the four transmit antennas case, two additional TD schemes are listed, such as Space Time Transmit Diversity (STTD) and Space Time Transmit Diversity-Phase Switched Transmit Diversity (STTD-PSTD). Note that FIGS. 3 and 4 display specific implementations of TD decoders for STS and OTD and that TD decoders for other TD schemes are similar, but not exactly the same. The data shows that the combined TD decoder (such as the one illustrated in FIG. 4) drastically reduces the number of multipliers at the expense of additional memory elements and adders when compared with straightforward TD decoder (such as illustrated in FIG. 3). Fortunately, adders and memory elements have significantly reduced complexity and physical size compared to multipliers.

TABLE 1

Comparison of Implementation Complexity

| Hardware Units | Decoder Structure | 2 Antenna TD | | | | 4 Antenna Orthogonal TD | | |
|---|---|---|---|---|---|---|---|---|
| | | STS | OTD | STTD | STS and OTD | STS-OTD | STTD-OTD | STTD-PSTD |
| Real Multiplier | Straightforward Implementation | 32 | 8 | 16 | 40 | 32 | 32 | 32 |
| | Combined Implementation | 16 | 8 | 8 | 16 | 16 | 16 | 8 |
| Adder | Straightforward Implementation | 12 | 8 | 12 | 12 | 32 | 24 | 24 |
| | Combined Implementation | 16 | 8 | 16 | 16 | 36 | 32 | 16 |
| Memory Element | Straightforward Implementation | 2 | 2 | 2 | 2 | 4 | 4 | 4 |
| | Combined Implementation | 4 | 4 | 4 | 16 | 20 | 12 | 4 |

Although the combined TD decoder (STS and OTD) displayed in FIG. 4 realizes a significant reduction in the number of multipliers for a TD decoder supporting multiple TD schemes, it supports only two TD schemes, namely STS and OTD. The addition of other TD schemes would necessarily require the redesign of the TD decoder displayed in FIG. 4. Additionally, the reduction in the number of multipliers is at the expense of an increased number of adders and memory elements. It is desired that a TD decoder be able to support different TD schemes without requiring the redesign of the decoder.

Referring now to FIG. 5, the block diagram illustrates a high-level view of a receiver 500 capable of supporting an arbitrary number of TD schemes according to a preferred embodiment of the present invention. The receiver 500 is capable of decoding various different TD schemes, and it will also operate in a wireless communications network where there is no transmission diversity. The receiver 500 includes a de-spreading unit 505. The de-spreading unit 505 can be similar to the de-spreading unit 205 (FIG. 2) or other de-spreading units used in other wireless communications system. The de-spreading unit 505 has two inputs, the first being the received signal and the second being a local copy of the spreading code used to spread the data stream at the transmitter. The operation of the de-spreading unit 505 is similar to what is previously described and will not be described in this section.

The output of the de-spreading unit 505 is provided to a TD decoding and interference cancellation unit (TDIC) 510. In terms of functionality, the TDIC 510 may be thought of as a combination of a TD decoder, such as the TD decoder 210 (FIG. 2), and an interference cancellation unit, such as the interference cancellation unit 215 (FIG. 2). The TDIC 510 performs both the TD decoding and the interference cancellation on the de-spread signal at the same time. Notice however that if the TD scheme uses orthogonal diversity, then no interference cancellation between antennas is required, although for generality (and the support of non-orthogonal TD schemes), the interference cancellation functionality is present in the TDIC 510.

The TDIC 510 has a second input where, according to a preferred embodiment of the present invention, it receives functions of the channel estimations. Rather than simply receiving the channel estimations, as in the TD decoder 210 displayed in FIG. 2, the TDIC 510 receives what can be described as functions of the channel estimations. Functions of channel estimations are pre-determined based on the particular TD scheme. The functions of channel estimations are used in the TD decoding and interference cancellation in the TDIC 510. Each function of channel estimations uses four real multipliers (not shown) inside the TDIC 510 to multiply the de-spread symbols. Finally, the output of the TDIC 510 is provided to a rake combiner 512. The rake combiner 512 is similar to the rake combiner 212 (FIG. 2). Similar to FIG. 2, the rake combiner 512 can also be placed after the functions of channel estimation are applied to the de-spread signals inside TDIC 510.

Each function of channel estimates is typically a list of computed channel estimates. Each element in a function is then applied to a de-spread symbol and the results are combined to produce a single de-spread and TD decoded symbol. According to a preferred embodiment of the present invention, the TD receiver operates at a given clock frequency, and at each period, the de-spreading unit 505 produces a de-spread symbol and the TDIC 510 multiplies the de-spread symbol with an element of the functions of channel estimations.

Referring now to FIGS. 6a-e, the figures display different functions of channel estimations for commonly used TD schemes. FIG. 6a displays the functions of channel estimations for STS with two transmit antennas. For example, a function of channel estimations 605, $f_1(h)$, is one of eight functions of channel estimations needed. The function of channel estimations, $f_1(h)$ 605, is computed to being (first term) the real part of the conjugate of the $1^{st}$ column and $0^{th}$ row (1, 0) element of the transpose of the channel matrix plus the (2, 0) element of the transpose of the channel matrix and (second term) the real part of the conjugate of the (1, 1) element of the channel matrix minus the (2, 1) element of the channel matrix. The remaining seven functions of channel estimations are computed in a similar fashion. Note that the elements in the channel matrix are channel estimates for different transmit antennas.

Notice that the function of channel estimations, $f_1(h)$ 605, comprises two terms, where the first term is applied to a first of two consecutive de-spread symbols and the second term is applied to a second of two de-spread symbols, in a manner much like the one described in FIG. 3. The remaining figures present functions of channel estimations for other TD schemes: OTD—two transmit antenna (FIG. 6b), STTD—two transmit antenna (FIG. 6c), STTD-OTD—four transmit antenna (FIG. 6d), and STS-OTD—four transmit antenna (FIG. 6e). Note that the functions of channel estimations for the four transmit antenna cases (FIGS. 6d and 6e) have four terms and operate on four received symbols. Additionally, for the four transmit antenna cases, there are 16 functions of channel estimations rather than eight as in the two transmit antenna case.

Figure 7:
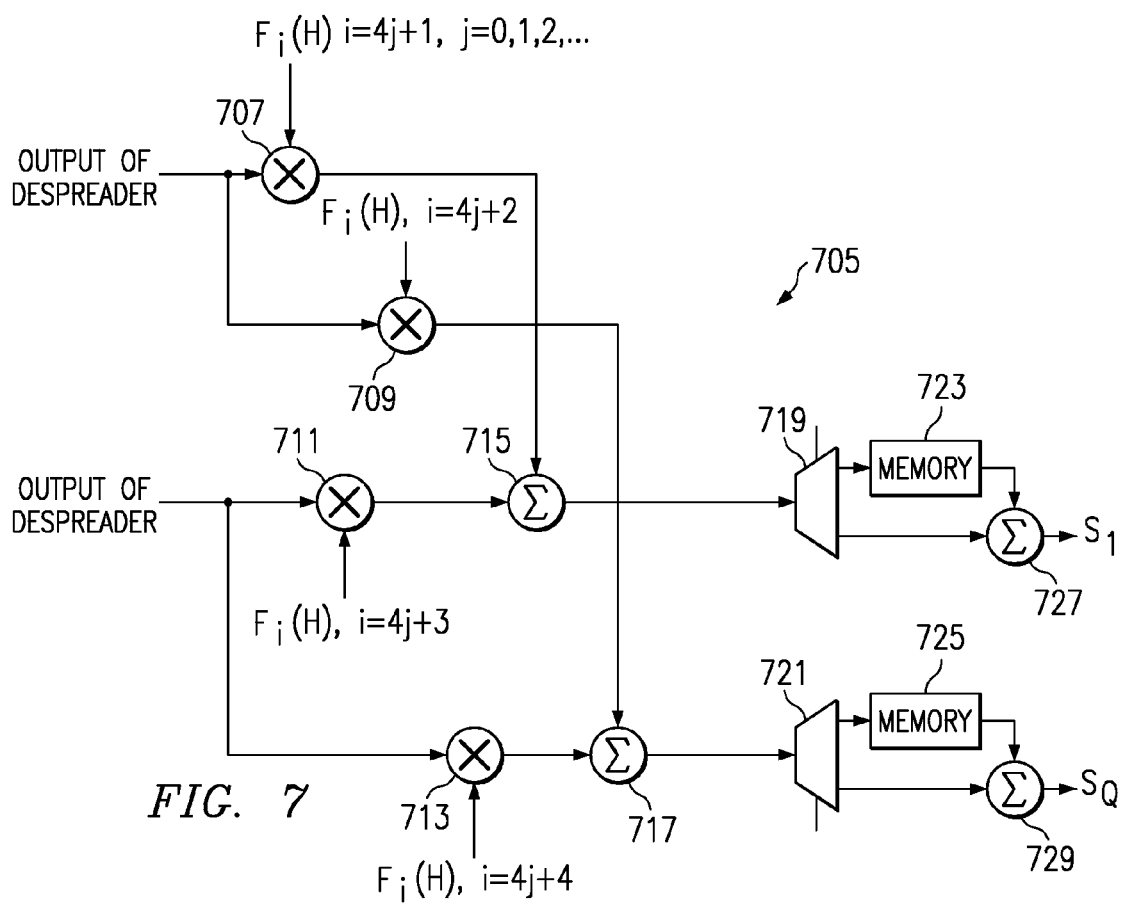
FIG. 7 illustrates a detailed view of a transmit diversity decoder for use in a receiver that is capable of supporting a variety of different transmit diversity schemes according to a preferred embodiment of the present invention.

Referring now to FIG. 7, the block diagram illustrates a detailed view of a portion 705 of a TD decoder with support for a variety of different TD schemes according to a preferred embodiment of the present invention. According to a preferred embodiment of the present invention, the portion 705 of a TD decoder has two inputs that provide a de-spread symbol stream produced by a de-spreading unit. The two inputs provide the in-phase and quadrature-phase symbols from the received signal. The in-phase symbol stream, $r_{1,I}, \ldots r_{N-1,I}$, is provided to two real number multipliers 707 and 709 while the quadrature-phase symbol stream, $r_{1,Q} \ldots r_{N-1,Q}$, is provided to two other real number multipliers 711 and 713. Each of the four real number multipliers has as its other input one of the functions of channel estimations. For example, multiplier 709 could have as its other input, the function of channel estimations 605 (FIG. 6a) if the TD decoder were configured to TD decode a STS TD scheme.

After the first elements of the individual functions of channel estimations are multiplied with a first de-spread symbol, the results are summed in a pair of summing circuits 715 and 717. The output of multiplier 707 is combined with the output of multiplier 711 and the output of multiplier 709 is combined with the output of multiplier 713. After the addition by the summing circuits, the results of the multiplication of the first de-spread symbols and the first elements of the individual functions of channel estimations are provided to a pair of multiplexors 719 and 721 (or a like circuit) that directs the outputs to memory elements 723 and 725. The memory elements 723 and 725 are used to store the results from the first de-spread symbols while the results from a second de-spread symbol are being computed. After the results from the second de-spread symbol have been completed, the two results are summed in a pair of summing circuits 727 and 729 and a pair of de-spread and TD decoded symbols ($s_I$ and $s_Q$) are produced. The de-spread and TD decoded symbols represent the data stream as transmitted by the transmitter and is ready for any additional signal processing or use by any device coupled to the TD receiver.

According to a preferred embodiment of the present invention, the portion 705 of a TD decoder is simply replicated to form an actual TD decoder, with one portion 705 for each transmit antenna in the TD transmitter. Therefore, if there are two transmit antennas, then there would be two portions 705 in each TD decoder and if four transmit antennas were being used, then four portions 705 would be present in each TD decoder. In a TD decoder with more than two portions 705, the memory elements (for example memory element 723) would necessarily be larger to hold more multiplication/summation results. For example, in a four transmit antenna system, the memory elements would need to store three de-spread symbols. In general, in an N transmit antenna system, each memory element needs to store multiplication/summation results from up to N−1 de-spread symbols prior to the creation of a single de-spread and TD decoded symbol.

According to another preferred embodiment of the present invention, the portion 705 of a TD decoder may be used in a non-TD wireless communications system. In such a situation, the individual functions of channel estimations would be the channel estimation itself and the memory elements (memory elements 723 and 725) would not be used. An advantage of using the portion 705 in a non-TD system is that hardware requirements are minimized, with the ability to support TD schemes.

For comparison purposes, Table 2 below provides a tabulation of TD decoder components for the portion 705 of a TD decoder for various TD schemes and with two and four transmit antennas. Comparing Table 2 with Table 1 (discussed earlier), it is clear that use of replicated portions 705 of a TD decoder results in significant savings in hardware.

TABLE 2

Implementation Complexity of Present Invention

| | | 2 Antenna TD | | | | 4 Antenna Orthogonal TD | | |
| --- | --- | --- | --- | --- | --- | --- | --- | --- |
| Operators | Receiver Structure | STS | OTD | STTD | STS and OTD | STS-OTD | STTD-OTD | STTD-PSTD |
| Real Multiplier | Present Invention | 8 | 8 | 8 | 8 | 16 | 16 | 8 |
| Adder | Present Invention | 8 | 8 | 8 | 8 | 20 | 16 | 8 |
| Memory Element | Present Invention | 4 | 4 | 4 | 16 | 20 | 12 | 4 |

According to another preferred embodiment of the present invention, the number of multipliers used in the portion 705 of the TD decoder may be reduced in half by sharing the multipliers and increasing the number of memory elements. For example, multipliers 711 and 713 can be eliminated and multipliers 707 and 709 can be used in their place if memory elements are present to store necessary intermediate values. Additionally, the summing circuit 717 can be eliminated and summing circuit 715 can perform in its place. The number (or size) of the memory elements would need to be increased along with the addition of a small amount of additional hardware to allow the sharing of the remaining multipliers and summing circuits.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for processing a transmission diversity (TD) encoded transmission comprising:
   receiving the TD encoded transmission;
   de-spreading the TD encoded transmission;
   applying a set of functions of channel estimations to the de-spread TD encoded transmission to produce TD decoded symbols, wherein several de-spread TD encoded symbols are used to produce a single TD decoded symbol and wherein the number of the de-spread TD encoded symbols used to produce the single TD decoded symbol corresponds to a number of symbol periods during which a TD encoded symbol is TD encoded and transmitted; and
   wherein each function of channel estimations is a list of functions computed from channel estimates and wherein the applying step comprises:
   at each clock cycle i between 1 and M, creating an intermediate symbol, $S_i$; and
   combining all intermediate symbols into the TD decoded symbol;
   wherein M is the number of transmit antennas.

2. The method of claim 1, wherein a different set of functions of channel estimates is used for each different TD scheme decoded.

3. The method of claim 1 further comprising the step of combining the TD decoded symbols into a single TD decoded signal stream.

4. The method of claim 3, wherein the combining step is performed by a rake combiner.

5. The method of claim 1, wherein the applying step further comprises the step of canceling interference that are the result of non-orthogonal TD schemes.

6. The method of claim 1, wherein each function of channel estimations is a list of functions computed from channel estimates, and the number of the de-spread TD encoded symbols used to produce a single TD decoded symbol is equal to a number of elements in the list of computed channel estimates.

7. The method of claim 1, wherein the intermediate symbols are stored in a memory.

8. The method of claim 1, wherein the creating steps include multiplying and adding an i-th de-spread TD encoded symbols with an i-th element in the list of functions computed from channel estimates according to a specified TD scheme, where i is an integer number between 1 and the M.

9. The method of claim 1, wherein the combining step repeats every M clock cycles.

10. A circuit comprising:
a first multiplier arm having an input coupled to a de-spreader, the first multiplier arm comprising a first and a second multiplier, the first multiplier to multiply a first de-spread symbol with a first function of channel estimations and the second multiplier to multiply the first de-spread symbol with a second function of channel estimations;
a second multiplier arm having an input coupled to the de-spreader, the second multiplier arm comprising a third and a fourth multiplier, the third multiplier to multiply a second de-spread symbol with a third function of channel estimations and the fourth multiplier to multiply the second de-spread symbol with a fourth function of channel estimations;
a first summing circuit coupled to the first and the second multiplier arms, the first summing circuit to combine the products of the first and third multipliers;
a second summing circuit coupled to the first and second multiplier arms, the second summing circuit to combine the products of the second and fourth multipliers;
a third summing circuit coupled to the first summing circuit, the third summing circuit to combine the output of the first summing circuit with a previous output of the first summing circuit;
a fourth summing circuit coupled to the second summing circuit, the fourth summing circuit to combine the output of the second summing circuit with a previous output of the second summing circuit;
a first switch having an input coupled to the first summing circuit and a first output coupled to a first memory element and a second output coupled to the third summing circuit, the first switch to selectively route the output of the first summing circuit; and
a second switch having an input coupled to the second summing circuit and a first output coupled to a second memory element and a second output coupled to the fourth summing circuit, the second switch to selectively route the output of the second summing circuit, wherein both switches have a control signal line and both switches are controlled by a same control signal and the control signal alternates between one of two values; and
wherein there are N transmit antennas, and the switches are controlled to route the outputs of the first and second summing circuits to the first and second memory elements and to the second and fourth summing circuits for one clock cycle.

* * * * *